(12) United States Patent
Jang et al.

(10) Patent No.: US 9,843,031 B2
(45) Date of Patent: Dec. 12, 2017

(54) RECHARGEABLE BATTERY

(71) Applicant: SAMSUNG SDI CO., LTD., Yongin-si, Gyeonggi-do (KR)

(72) Inventors: Myung-Jae Jang, Yongin-si (KR); Sang-Won Byun, Yongin-si (KR); Chi-Young Lee, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 174 days.

(21) Appl. No.: 14/826,757

(22) Filed: Aug. 14, 2015

(65) Prior Publication Data

US 2016/0248072 A1     Aug. 25, 2016

(30) Foreign Application Priority Data

Feb. 24, 2015   (KR) .................. 10-2015-0026026

(51) Int. Cl.
| | |
|---|---|
| *H01M 2/02* | (2006.01) |
| *H01M 2/30* | (2006.01) |
| *H01M 2/26* | (2006.01) |
| *H01M 2/04* | (2006.01) |

(52) U.S. Cl.
CPC ............ *H01M 2/30* (2013.01); *H01M 2/266* (2013.01); *H01M 2/02* (2013.01); *H01M 2/0202* (2013.01); *H01M 2/0237* (2013.01); *H01M 2/04* (2013.01); *H01M 2/043* (2013.01); *H01M 2/0404* (2013.01); *H01M 2220/20* (2013.01); *H01M 2220/30* (2013.01)

(58) Field of Classification Search
CPC ......... H01M 2220/20; H01M 2220/30; H01M 2/02; H01M 2/0202; H01M 2/0237; H01M 2/04; H01M 2/0404; H01M 2/043; H01M 2/266; H01M 2/30
See application file for complete search history.

(56) References Cited

U.S. PATENT DOCUMENTS

| | | |
|---|---|---|
| 7,887,943 B2 | 2/2011 | Yoshikane et al. |
| 2011/0244310 A1* | 10/2011 | Kim .................. H01M 2/0212 429/158 |

FOREIGN PATENT DOCUMENTS

| | | |
|---|---|---|
| KR | 10-1026925 B1 | 3/2011 |
| KR | 10-2012-0098001 A | 9/2012 |

* cited by examiner

*Primary Examiner* — Milton I Cano
*Assistant Examiner* — Ben Lewis
(74) *Attorney, Agent, or Firm* — Lee & Morse, P.C.

(57) ABSTRACT

A rechargeable battery including an electrode assembly having first and second electrodes at respective surfaces of a separator; a case that houses the electrode assembly; a cap plate that closes and seals an opening of the case and that is electrically connected to the second electrode; a first electrode terminal that is electrically connected to the first electrode and that is provided at an outer side of the cap plate through a terminal hole in the cap plate; and a second electrode terminal that is directly connected to an outer surface of the cap plate, wherein the second electrode terminal includes a separation portion that is spaced apart from the cap plate; and a support that is connected to the separation portion, the support being supported on the cap plate and including a coupling portion, and wherein the coupling portion is coupled with a corresponding portion of the cap plate.

10 Claims, 9 Drawing Sheets

RECHARGEABLE BATTERY

CROSS-REFERENCE TO RELATED APPLICATION

Korean Patent Application No. 10-2015-0026026 filed on Feb. 24, 2015, in the Korean Intellectual Property Office, and entitled "Rechargeable Battery," is incorporated by reference herein in its entirety.

BACKGROUND

1. Field

Embodiments relate to a rechargeable battery.

2. Description of the Related Art

A rechargeable battery may be repeatedly charged and discharged, unlike a primary battery. A rechargeable battery of a small capacity may be used for a small portable electronic device (like a mobile phone, a laptop computer, or a camcorder), and a rechargeable battery of a large capacity may be used as a power source for driving a motor of a hybrid vehicle.

A rechargeable battery may include an electrode assembly that is formed by having a positive electrode and a negative electrode at respective surfaces of a separator, a case that houses the electrode assembly, a cap plate that closes and seals an opening of the case, and an electrode terminal that is installed in the cap plate to be electrically connected to the electrode assembly.

The above information disclosed in this Background section is only for enhancement of understanding of the background of the invention and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly having a first electrode and a second electrode at respective surfaces of a separator; a case that houses the electrode assembly; a cap plate that closes and seals an opening of the case and that is electrically connected to the second electrode; a first electrode terminal that is electrically connected to the first electrode and that is provided at an outer side of the cap plate through a terminal hole in the cap plate; and a second electrode terminal that is directly connected to an outer surface of the cap plate, wherein the second electrode terminal includes a separation portion that is spaced apart from the cap plate; and a support that is connected to the separation portion, the support being supported on the cap plate and including a coupling portion, and wherein the coupling portion is coupled with a corresponding portion of the cap plate.

The support may further include a flange adjacent to the cap plate, the flange being bent from the support and contacting the cap plate.

The coupling portion may be a concave groove in the flange, and the corresponding portion may be a protrusion on the cap plate, the corresponding portion being coupled with the concave groove.

The flange may be formed at both sides of the second electrode terminal in a widthwise direction of the second electrode terminal and at both sides of the second electrode terminal in a lengthwise direction of the second electrode terminal.

The concave groove may extend inwardly in the flange in the lengthwise direction of the second electrode terminal at both sides of the second electrode terminal relative to the lengthwise direction of the second electrode terminal.

The protrusion may extend along a widthwise direction of the cap plate at both sides of the second electrode terminal relative to the lengthwise direction of the second electrode terminal.

The concave groove may extend inwardly in the flange in the lengthwise direction at both sides of the second electrode terminal relative to the lengthwise direction of the second electrode terminal and is separated in the widthwise direction of the second electrode terminal to be provided in plural.

The protrusion may be separated in the widthwise direction of the second electrode terminal to be provided in plural and is at both sides of the cap plate relative to the lengthwise direction of the cap plate.

The corresponding portion may be a receiving groove that concavely recedes in the cap plate from the outer surface to an inner surface of the cap plate and is complementary to the flange.

The coupling portion may be a concave groove in the support, and the corresponding portion may be a protrusion on the cap plate and may be coupled with the concave groove.

The second electrode terminal may be produced by performing a press construction method.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
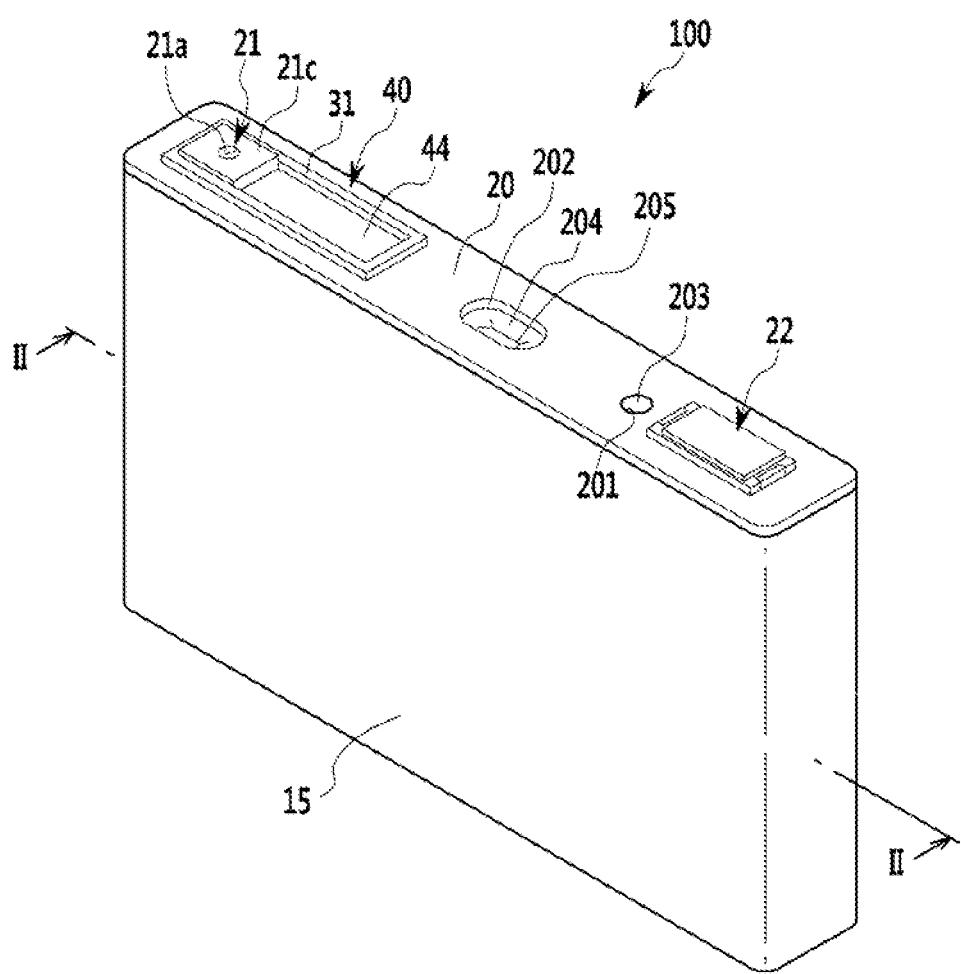
FIG. 1 illustrates a perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
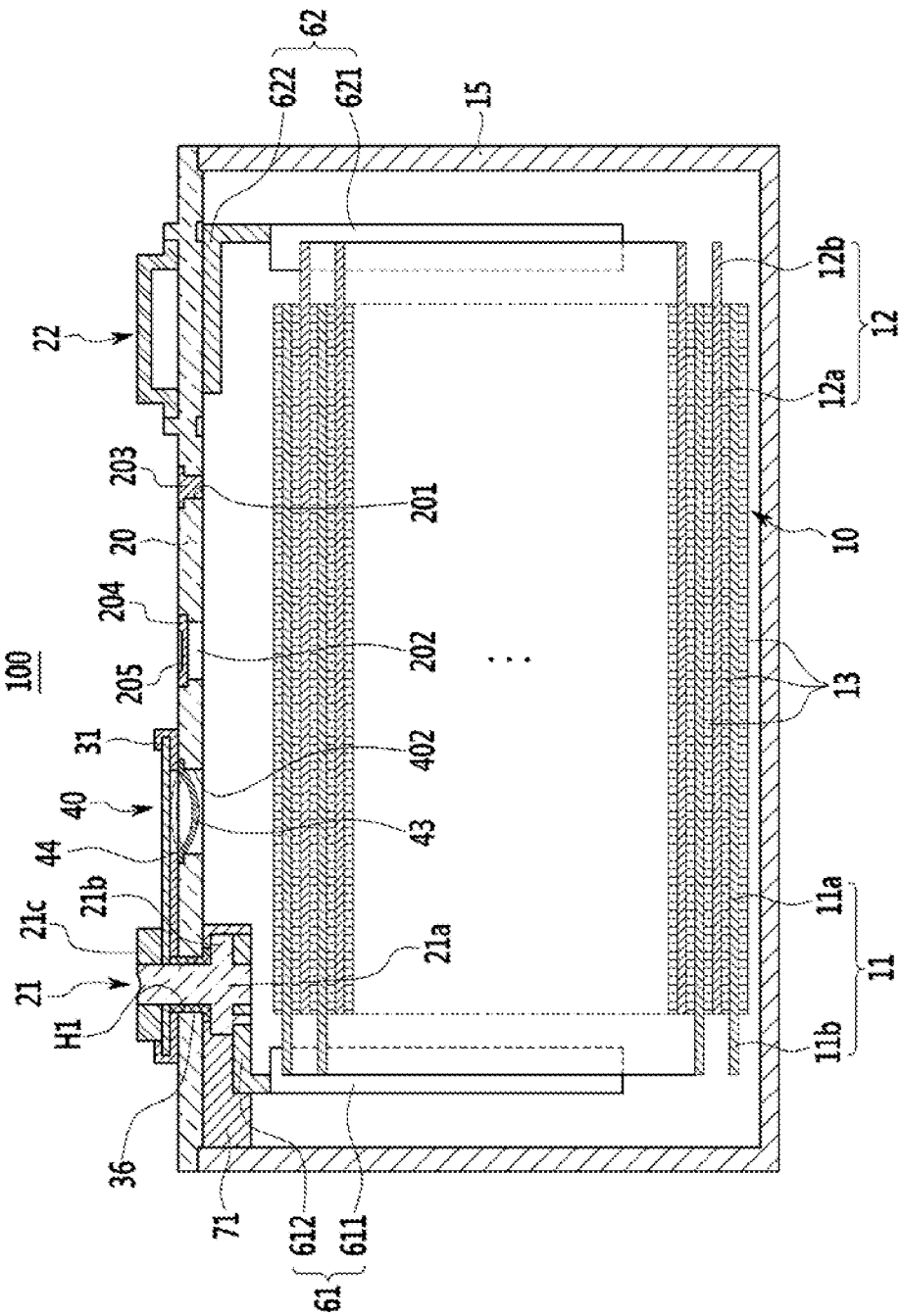
FIG. 2 illustrates a cross-sectional view of the rechargeable battery taken along line II-II of FIG. 1.

FIG. 1 illustrates a perspective view of a rechargeable battery according to a first exemplary embodiment. FIG. 2 illustrates a cross-sectional view of the rechargeable battery taken along line II-II of FIG. 1.

Referring to FIGS. 1 and 2, a rechargeable battery 100 according to the first exemplary embodiment may include an electrode assembly 10 (that performs a charge and discharge operation), a case 15 (that houses the electrode assembly 10), a cap plate 20 (that closes and seals an opening of the case 15), a first electrode terminal 21 (for convenience, referred to as a "negative electrode terminal") that is installed in a terminal hole H1 of the cap plate 20, and a second electrode terminal 22 (for convenience, referred to as "a positive electrode terminal") that is directly connected to an outer surface of the cap plate 20.

In an implementation, the electrode assembly 10 may be formed by disposing a first electrode 11 (for convenience, referred to as a "negative electrode") and a second electrode 12 (for convenience, referred to as a "positive electrode") at respective surfaces of a separator 13, which is an insulator, and by spirally-winding the negative electrode 11, the separator 13, and the positive electrode 12 in a jelly roll state. In an implementation, the electrode assembly 10 may be formed by stacking the negative electrode 11 and the positive electrode 12 with the separator 13 therebetween.

The negative electrode 11 and the positive electrode 12 may respectively include coated regions 11a and 12a (at which an active material is applied to a current collector made of, e.g., a metal foil), and uncoated regions 11b and 12b, respectively, (that are formed with an exposed current collector where an active material is not applied thereto).

The uncoated region 11b of the negative electrode 11 may be formed in an end portion of one side of the negative electrode 11 along the, e.g., spiral-wound, negative electrode 11. The uncoated region 12b of the positive electrode 12 may be formed in an end portion of one side of the positive electrode 12 along the, e.g., spiral-wound, positive electrode 12. For example, the uncoated regions 11b and 12b of the negative and positive electrodes 11 and 12 may be disposed at opposite ends of the electrode assembly 10.

The negative electrode 11 may be installed or connected in an electrical insulating state in or on the cap plate 20 through an external short circuit portion 40. When an internal pressure of the rechargeable battery 100 rises, the negative electrode 11 may be short-circuited from or with the cap plate 20 by operation of the external short circuit portion 40. In contrast, the positive electrode 12 may be directly electrically connected to the cap plate 20. For example, the cap plate 20 and the case 15 may have the same polarity and/or may be charged as a positive electrode.

For example, the case 15 may be formed in an approximate cuboid to set or include a space that houses the electrode assembly 10 and an electrolyte solution therein. The case 15 may include an opening that connects the outside and an internal space at one surface of the cuboid. The opening may facilitate the electrode assembly 10 to be inserted into the case 15.

The cap plate 20 may be coupled with and/or welded to an opening of the case 15 to close and seal the case 15. For example, the cap plate 20 and the case 15 may be made of aluminum to be welded to each other. In an implementation, the cap plate 20 has an electrolyte injection opening 201, a vent hole 202, and/or a short circuit hole 402.

The electrolyte injection opening 201 may facilitate injection of an electrolyte solution into the case 15. After the electrolyte solution is injected, the electrolyte injection opening 201 may be sealed by a seal stopper 203.

The vent hole 202 may be closed and sealed by a welded vent plate 204. When an internal pressure of the rechargeable battery 100 reaches or exceeds a predetermined pressure, the vent plate 204 may be cut out or burst to open the vent hole 202. The vent plate 204 may have a notch 205 that induces or directs cutout.

The negative electrode terminal 21 may be installed in or through the terminal hole H1 of the cap plate 20 to be electrically connected to the negative electrode 11 of the electrode assembly 10. The negative electrode terminal 21 may include a rivet terminal 21a that is installed in the terminal hole H1 of the cap plate 20, a flange 21b that is integrally and widely formed in or on the rivet terminal 21a at an inside or interior side of the cap plate 20, and a plate terminal 21c at an outside or exterior side of the cap plate 20 to be connected to the rivet terminal 21a by, e.g., riveting or welding.

A negative electrode gasket 36 may be inserted between the rivet terminal 21a of the negative electrode terminal 21 and an inner surface of the terminal hole H1 to electrically insulate and seal between the rivet terminal 21a of the negative electrode terminal 21 the cap plate 20. The negative gasket 36 may be further extended between the flange 21b and an inner surface of the cap plate 20 to electrically insulate and further seal between the flange 21b and the cap plate 20.

A negative electrode lead tab 61 may electrically connect the negative electrode terminal 21 to the uncoated region 11b of the negative electrode 11 of the electrode assembly 10. For example, the negative electrode lead tab 61 may include a bent current collecting portion 611 and connection portion 612. The current collecting portion 611 may be connected by welding to the uncoated region 11b of the electrode assembly 10, and the connection portion 612 may be connected to the rivet terminal 21a.

For example, by caulking or welding the lower end while coupling the connection portion 612 of the negative electrode lead tab 61 to the lower end of the rivet terminal 21a, while the connection portion 612 of the negative electrode lead tab 61 is supported to the flange 21b, the connection portion 612 may be connected to the lower end of the rivet terminal 21a in a conductive structure.

An internal insulator 71 may be installed between the connection portion 612 of the negative electrode lead tab 61 and the cap plate 20 to electrically insulate the connection portion 612 of the negative electrode lead tab 61 and the cap plate 20. In an implementation, the internal insulator 71 may closely contact the cap plate 20 at one side and may enclose the connection portion 612 of the negative electrode lead tab 61, the rivet terminal 21a, and the flange 21b at the other side, thereby stabilizing a connection structure thereof.

The negative electrode gasket 36 may be further extended and inserted between the rivet terminal 21a of the negative electrode terminal 21 and the external short circuit portion 40 (e.g., a hole of a negative electrode insulator 31 corresponding to the terminal hole H1). The external short circuit portion 40 may be formed to maintain a separated state or to short circuit according to an internal pressure of the rechargeable battery 100.

The external short circuit portion 40 may include a membrane 43 that closes and seals the short circuit hole 402 that is formed in the cap plate 20 and that may be inverted according or in response to an internal pressure, and a short circuit tab 44 that is electrically connected to the negative electrode terminal 21 to be separately disposed at one side of the membrane 43. The membrane 43 may be welded to the short circuit hole 402 to close and seal the short circuit hole 402. The short circuit tab 44 may be installed between the negative electrode insulator 31 and the plate terminal 21c to be extended onto the membrane 43.

In a state in which the rechargeable battery 100 normally operates, the short circuit tab 44 may maintain a separated state from the membrane 43. When an internal pressure of the rechargeable battery 100 rises and reaches and/or exceeds a predetermined pressure, the membrane 43 may be inverted to be short-circuited with the short circuit tab 44. In this way, at the outside of the electrode assembly 10, because the membrane 43 is short-circuited, a current that is charged at the electrode assembly 10 may be safely discharged at the outside of the electrode assembly 10.

In an implementation, the cap plate 20 may be charged as a positive electrode, and the short circuit tab 44 of the external short circuit portion 40 and the rivet terminal 21a of the negative electrode terminal 21 may be installed by interposing the negative electrode insulator 31 on the cap plate 20. The negative electrode insulator 31 may have holes corresponding to the terminal hole H1 and the short circuit hole 402 to not disturb installation of the rivet terminal 21a and inversion of the membrane 43.

A positive lead tab 62 may be electrically connected to the uncoated region 12b of the positive electrode 12 of the electrode assembly 10. For example, the positive lead tab 62 may include a bent current collecting portion 621 and a connection portion 622. The current collecting portion 621 may be connected to the uncoated region 12b of the electrode assembly 10 by, e.g., welding, and the connection portion 622 may be welded to an inner surface of the cap plate 20.

The positive electrode terminal 22 may be directly connected to the cap plate 20 (that is charged as or has a same polarity as a positive electrode). For example, the positive electrode terminal 22 may be electrically connected to the positive electrode 12 of the electrode assembly 10 through the cap plate 20 and the positive lead tab 62. Therefore, the electrode assembly 10 may be drawn outside of the case 15 through the negative electrode terminal 21 and the positive electrode terminal 22.

Figure 3:
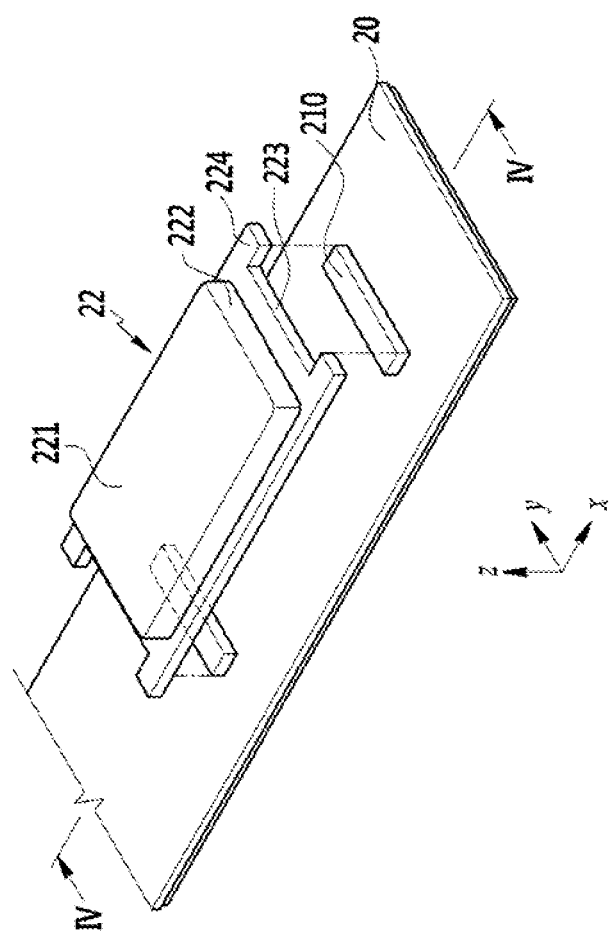
FIG. 3 illustrates an exploded perspective view of a cap plate and an electrode terminal in FIG. 1.
Figure 4:
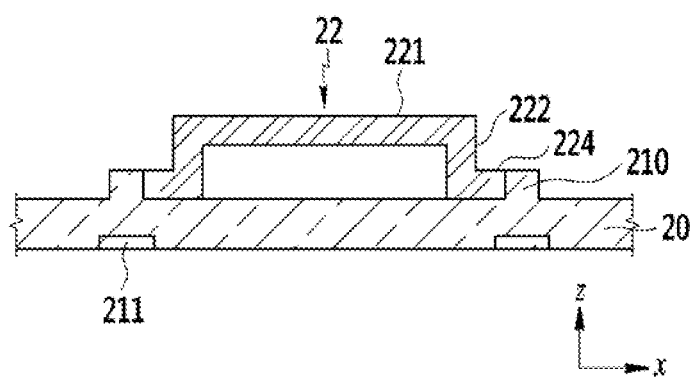
FIG. 4 illustrates a cross-sectional view of the coupled cap plate and electrode terminal taken along line IV-IV of FIG. 3.

FIG. 3 illustrates an exploded perspective view of a cap plate and an electrode terminal of FIG. 1. FIG. 4 illustrates a cross-sectional view of the coupled cap plate and electrode terminal taken along line IV-IV of FIG. 3.

Referring to FIGS. 3 and 4, the positive electrode terminal 22 may include a separation portion 221 (that is separated or spaced apart from the cap plate 20), and a support 222 (that is connected to the separation portion 221 to be supported on or coupled with the cap plate 20). The support 222 may have a coupling portion 223. The support 222 may be coupled with a corresponding portion 210 (in or on the cap plate 20) by the coupling portion 223. Therefore, when welding the positive electrode terminal 22 to the cap plate 20, rotation of the positive electrode terminal 22 may be reduced and/or prevented, and a location thereof may be stably fixed.

For example, the support 222 may further include a flange 224 at a side thereof that is adjacent to the cap plate 20, and the flange 224 may contact the cap plate 20. By enlarging a contact area with the cap plate 20, the flange 224 may help stabilize electrical connection and mechanical strength.

For example, the coupling portion 223 may be formed as or may take the form of a concave groove in the flange 224. When forming the positive electrode terminal 22 by performing a drawing or press construction method, the coupling portion 223 may be formed, and thus a separate process may not be required. Therefore, production cost of the positive electrode terminal 22 may be reduced and productivity may be improved.

The corresponding portion 210 may be formed as or may take the form of a protrusion that protrudes from or on an outer surface of the cap plate 20 (by, e.g., press processing the cap plate 20) to correspond to or complement the concave groove coupling portion 223 of the positive electrode terminal 22. For example, at an inner surface of the cap plate 20, a pressing groove 211 that results from forming the corresponding portion 210 may be provided. A protrusion of the corresponding portion 210 may be coupled with the concave groove-shaped coupling portion 223 in the support 222 and the flange 224.

The flange 224 may be formed on the positive electrode terminal 22 at both sides of the positive electrode terminal 22 relative to a widthwise direction (y-axis direction) of the positive electrode terminal 22. For example, the flange 224 may be formed at both outer sides of the positive electrode terminal 22 relative to a widthwise direction of the positive electrode terminal 22. The flange 224 may be formed in or on the positive electrode terminal 22 at both sides of a lengthwise direction (x-axis direction). In an implementation, the concave groove-shaped coupling portion 223 may be formed at both sides relative to the lengthwise direction (x-axis direction) of the positive electrode terminal 22 and may be formed by receding or extending inwardly in the lengthwise direction (x-axis direction) at the flange 224.

The protruding corresponding portion 210 may extend along a widthwise direction (y-axis direction of the cap plate 20) to correspond to or complement the coupling portion 223. For example, the corresponding portion 210 may be provided at both sides in a lengthwise direction (x-axis direction) of the cap plate 20 or the positive electrode terminal 22. For example, the coupling portion 223 and the corresponding portion 210 may be coupled along a widthwise direction (y-axis direction) at both sides relative to a lengthwise direction (x-axis direction) of the cap plate 20. When welding the positive electrode terminal 22 to the cap plate 20, a location of the positive electrode terminal 22 may be stabilized and the positive electrode terminal 22 may be prevented from rotating. Further, the coupling portion 223 and the corresponding portion 210 may be coupled and welded, and electrical connection and mechanical coupling strength of the positive electrode terminal 22 and the cap plate 20 may be improved.

Hereinafter, various exemplary embodiments will be described. In the following description, constituent elements identical to or corresponding to those of a first exemplary embodiment may be omitted, and only dissimilar constituent elements may be described.

Figure 5:
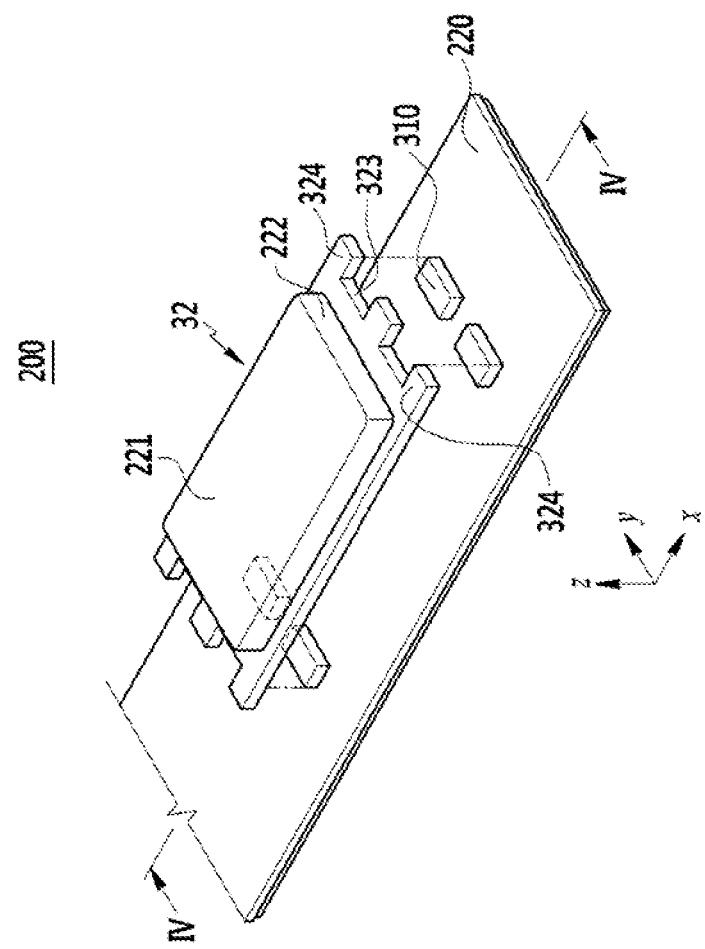
FIG. 5 illustrates an exploded perspective view of a cap plate and an electrode terminal in a rechargeable battery according to a second exemplary embodiment.
Figure 6:
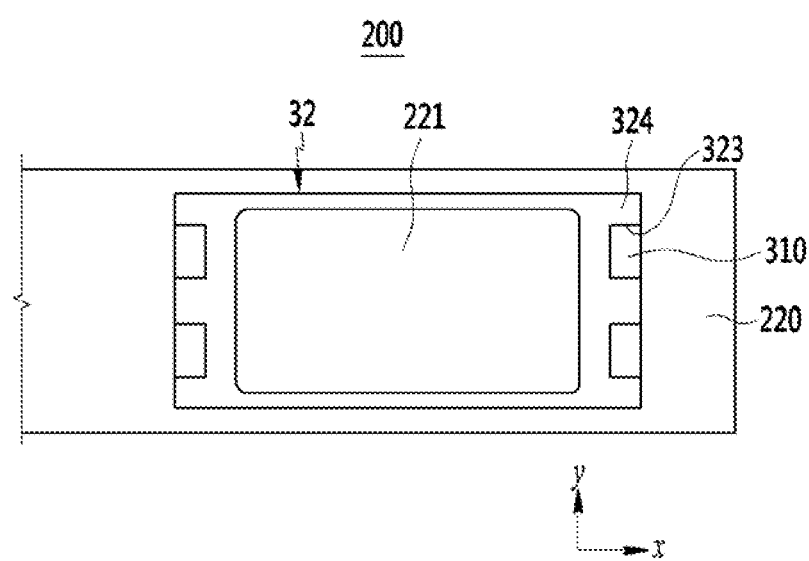
FIG. 6 illustrates a top plan view of a coupled cap plate and an electrode terminal of FIG. 5.

FIG. 5 illustrates an exploded perspective view of a cap plate and an electrode terminal in a rechargeable battery according to a second exemplary embodiment. FIG. 6 illustrates a top plan view of a coupled cap plate and electrode terminal of FIG. 5.

Referring to FIGS. 5 and 6, in a positive electrode terminal 32 of a rechargeable battery 200 according to the second exemplary embodiment, a concave groove-shaped coupling portion 323 may be formed at both sides relative to a lengthwise direction (x-axis direction) of the positive electrode terminal 32, may be formed by receding or extending inwardly in a length direction (x-axis direction) in a flange 324, and may be separated from one another in a widthwise direction (y-axis direction) to be formed or provided in plural.

A protruding corresponding portion 310 may be separated in a widthwise direction (y-axis direction) at both sides relative a lengthwise direction (x-axis direction) of the cap plate 220 or positive electrode terminal 32, and may be separated in a widthwise direction (y-axis direction) to be formed or provided in plural.

Therefore, the coupling portion 323 and the corresponding portion 310 may be separated, divided, and coupled along a widthwise direction (y-axis direction) at both sides relative to a lengthwise direction (x-axis direction) of the cap plate 220 or positive electrode terminal 32. For example, the coupling portion 323 and the corresponding portion 310 may have a complementary structure to facilitate coupling. Thus, when welding the positive electrode terminal 32 to the cap plate 220, the positive electrode terminal 32 may be prevented from rotating. Further, the coupling portion 323 and the corresponding portion 310 may be coupled and welded in plural, and electrical connection and mechanical coupling strength of the positive electrode terminal 32 and the cap plate 220 may be further improved.

Figure 7:
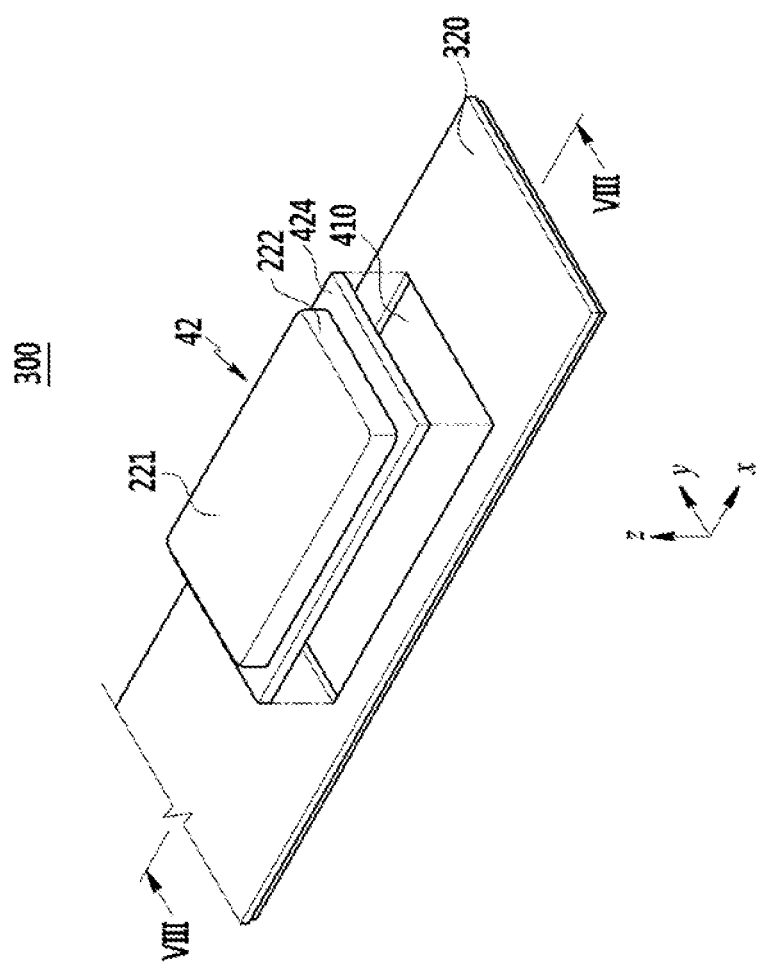
FIG. 7 illustrates an exploded perspective view of a cap plate and an electrode terminal in a rechargeable battery according to a third exemplary embodiment.
Figure 8:
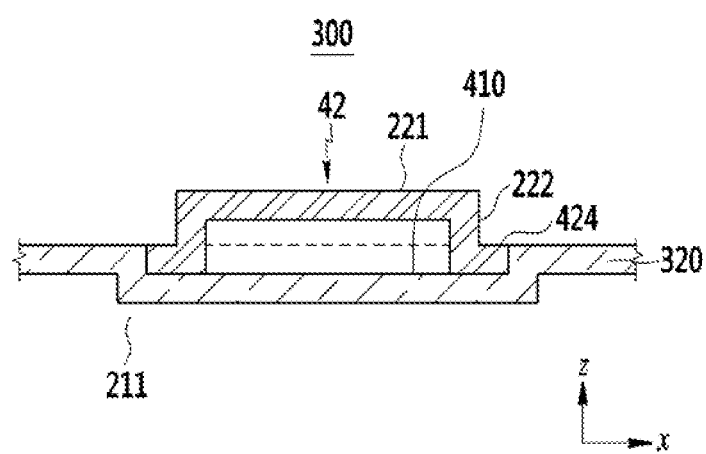
FIG. 8 illustrates a cross-sectional view of the coupled cap plate and electrode terminal taken along line VIII-VIII of FIG. 7.

FIG. 7 illustrates an exploded perspective view of a cap plate and an electrode terminal in a rechargeable battery according to a third exemplary embodiment. FIG. 8 illustrates a cross-sectional view of the coupled cap plate and electrode terminal taken along line VIII-VIII of FIG. 7.

Referring to FIGS. 7 and 8, in a rechargeable battery 300 according to a third exemplary embodiment, a corresponding portion 410 may be formed as a receiving groove concavely receding inwardly from an outer surface to an inner surface of a cap plate 320. The corresponding portion 410 may correspond to or complement a flange 424 of a positive electrode terminal 42.

For example, the flange 424 may circumferentially surround the positive electrode terminal 42. For example, the flange 424 and the corresponding portion 410 may be coupled at both sides relative to a lengthwise direction (x-axis direction) and both sides relative to a widthwise direction (y-axis direction) of the cap plate 320. For example, the positive electrode terminal 42 and the corresponding portion 410 may have a complementary structure to facilitate coupling. Thus, when welding the positive electrode terminal 42 to the cap plate 320, the positive electrode terminal 42 may be prevented from rotating.

Compared with the positive electrode terminals 22 and 32 of the first exemplary embodiment and the second exemplary embodiment, in the positive electrode terminal 42 of the third exemplary embodiment, a height (that is set in a z-axis direction) may be reduced, and the positive electrode terminal 42 may be effectively applied to the rechargeable battery 300 having a low height.

Figure 9:
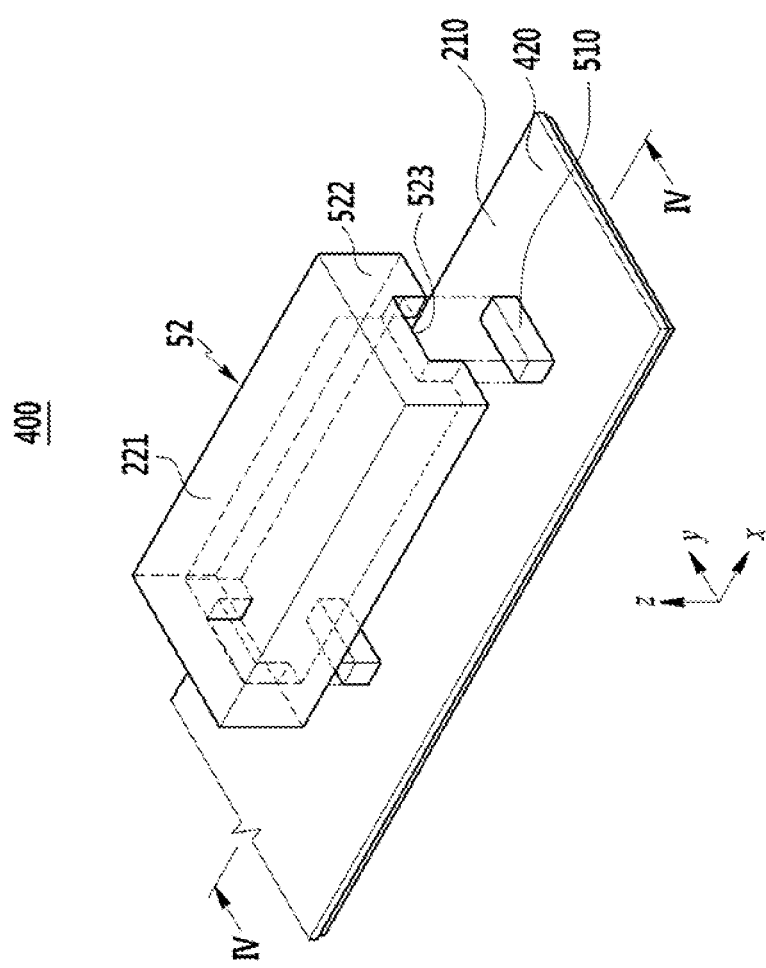
FIG. 9 illustrates an exploded perspective view of a cap plate and an electrode terminal in a rechargeable battery according to a fourth exemplary embodiment.

FIG. 9 illustrates an exploded perspective view of a cap plate and an electrode terminal in a rechargeable battery according to a fourth exemplary embodiment. Referring to FIG. 9, in a rechargeable battery 400 according to the fourth exemplary embodiment, a concave groove-shaped coupling portion 523 of a positive electrode terminal 52 may be in the form of a groove receding or extending in a z-axis direction in a support 522, e.g., in a direction orthogonal to a plane of the cap plate 420. A protruding corresponding portion 510 of a cap plate 420 may protrude from the cap plate 420 to couple with the concave groove-shaped coupling portion 523. For example, the coupling portion 523 and the corresponding portion 510 may have a complementary structure to facilitate coupling.

Therefore, the coupling portion 523 and the corresponding portion 510 may be coupled along a widthwise direction (y-axis direction) at both sides relative to a lengthwise direction (x-axis direction) of the cap plate 420 and, when welding the positive electrode terminal 52 to the cap plate 420, the positive electrode terminal 52 may be prevented from rotating.

Compared with the positive electrode terminals 22, 32, and 42 of the first exemplary embodiment to the third exemplary embodiment, the positive electrode terminal 52 of the fourth exemplary embodiment may not have a flange, and production cost of the positive electrode terminal 52 may be further reduced.

By way of summation and review, an electrode terminal may include a rivet terminal that is connected to an electrode assembly to be installed in a terminal hole of a cap plate, and a plate terminal that is disposed outside of the cap plate to be connected to the rivet terminal. The plate terminal may have a hole to which the rivet terminal is coupled.

For example, the plate terminal may be completed by shaping an outer edge of a plate terminal with a forging process and processing a hole through a cutting process. In this way, when producing the plate terminal, a forging process and a cutting process may be performed, and thus a cost to produce a plate terminal, i.e., an electrode terminal, may increase, and productivity may be deteriorated. This may result in a price increase of a rechargeable battery.

The embodiments may provide a rechargeable battery in which an electrode terminal is electrically connected to a cap plate.

The embodiments may provide a rechargeable battery having advantages of reducing a cost of producing an electrode terminal and improving productivity. The embodiments may provide a rechargeable battery having advantages of improving mechanical strength of an electrode terminal that is connected to a cap plate.

According to an exemplary embodiment, a (second) electrode terminal is formed with a separation portion and a support and a coupling portion that is formed in the support may be coupled to a corresponding portion of the cap plate, and thus production cost of the electrode terminal may be reduced and productivity may be improved.

The support of the electrode terminal may be coupled and welded to the corresponding portion of the cap plate, and mechanical strength of the electrode terminal that is connected to the cap plate may be improved. Further, the coupling portion of the electrode terminal may be coupled to the corresponding portion of the cap plate and, when welding the electrode terminal to the cap plate, the electrode terminal may be prevented from rotating and a location of the electrode terminal before welding can be fixed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

| | |
|---|---|
| 10: electrode assembly | 11: first electrode (negative electrode) |
| 11a, 12a: coated region | 11b, 12b: uncoated region |
| 12: second electrode (positive electrode) | |
| 13: separator | |
| 15: case | 20, 220, 320, 420: cap plate |
| 21: first electrode (negative electrode) terminal | |
| 21a: rivet terminal | |
| 21b: flange | 21c: plate terminal |
| 22, 32, 42, 52: second electrode (positive electrode) terminal | |
| 31: negative electrode insulator | |
| 36: negative electrode gasket | 40: external short circuit portion |

-continued

43: membrane
61, 62: negative and positive lead tabs
71: internal insulator
100, 200, 300, 400: rechargeable battery
201: electrolyte injection opening
202: vent hole
204: vent plate
210, 310, 410, 510: corresponding portion
221: separation portion
222, 522: support
224, 324, 424: flange
611, 621: current collecting portion
612, 622: connection portion
H1: terminal hole 44: short circuit tab 203: seal stopper
205: notch 223, 323, 523: coupling portion
402: short circuit hole

What is claimed is:

1. A rechargeable battery, comprising:
an electrode assembly having a first electrode and a second electrode at respective surfaces of a separator;
a case that houses the electrode assembly;
a cap plate that closes and seals an opening of the case and that is electrically connected to the second electrode;
a first electrode terminal that is electrically connected to the first electrode and that is provided at an outer side of the cap plate through a terminal hole in the cap plate; and
a second electrode terminal that is directly connected to an outer surface of the cap plate,
wherein the second electrode terminal includes:
a separation portion that is spaced apart from the cap plate; and
a support that is connected to the separation portion, the support being supported on the cap plate and including a coupling portion,
wherein the coupling portion is coupled with a corresponding portion of the cap plate, and
wherein the support further includes a flange adjacent to the cap plate, the flange being bent from the support and contacting the cap plate.

2. The rechargeable battery as claimed in claim 1, wherein:
the coupling portion is a concave groove in the flange, and
the corresponding portion is a protrusion on the cap plate, the corresponding portion being coupled with the concave groove.

3. The rechargeable battery as claimed in claim 2, wherein the flange is formed at both sides of the second electrode terminal in a widthwise direction of the second electrode terminal and at both sides of the second electrode terminal in a lengthwise direction of the second electrode terminal.

4. The rechargeable battery as claimed in claim 3, wherein the concave groove extends inwardly in the flange in the lengthwise direction of the second electrode terminal at both sides of the second electrode terminal relative to the lengthwise direction of the second electrode terminal.

5. The rechargeable battery as claimed in claim 4, wherein the protrusion extends along a widthwise direction of the cap plate at both sides of the second electrode terminal relative to the lengthwise direction of the second electrode terminal.

6. The rechargeable battery as claimed in claim 3, wherein the concave groove extends inwardly in the flange in the lengthwise direction at both sides of the second electrode terminal relative to the lengthwise direction of the second electrode terminal and is separated in the widthwise direction of the second electrode terminal to be provided in plural.

7. The rechargeable battery as claimed in claim 6, wherein the protrusion is separated in the widthwise direction of the second electrode terminal to be provided in plural and is at both sides of the cap plate relative to the lengthwise direction of the cap plate.

8. The rechargeable battery as claimed in claim 1, wherein the corresponding portion is a receiving groove that concavely recedes in the cap plate from the outer surface to an inner surface of the cap plate and is complementary to the flange.

9. The rechargeable battery as claimed in claim 1, wherein:
the coupling portion is a concave groove in the support, and
the corresponding portion is a protrusion on the cap plate and is coupled with the concave groove.

10. The rechargeable battery as claimed in claim 1, wherein the second electrode terminal is produced by performing a press construction method.

* * * * *